United States Patent
Kumar

(10) Patent No.: US 8,474,281 B2
(45) Date of Patent: Jul. 2, 2013

(54) SUSPENSION BRACKET

(75) Inventor: Lalit Kumar, Plano, TX (US)

(73) Assignee: Lennox Industries Inc., Richardson, TX (US)

( * ) Notice: Subject to any disclaimer, the term of this patent is extended or adjusted under 35 U.S.C. 154(b) by 409 days.

(21) Appl. No.: 12/834,113

(22) Filed: Jul. 12, 2010

(65) Prior Publication Data

US 2011/0174007 A1    Jul. 21, 2011

Related U.S. Application Data

(60) Provisional application No. 61/295,501, filed on Jan. 15, 2010.

(51) Int. Cl.
*F25D 23/12* (2006.01)

(52) U.S. Cl.
USPC .......................................... 62/259.1; 62/296

(58) Field of Classification Search
USPC .............. 62/259.1, 296, 297; 248/65; 29/428; 312/116, 140; 277/331, 343
See application file for complete search history.

(56) References Cited

U.S. PATENT DOCUMENTS

| | | | | |
|---|---|---|---|---|
| 5,027,614 | A * | 7/1991 | Mori et al. | 62/262 |
| 5,112,015 | A * | 5/1992 | Williams | 248/236 |
| 5,600,963 | A * | 2/1997 | Koo et al. | 62/262 |
| 5,622,058 | A * | 4/1997 | Ramakrishnan et al. | 62/295 |
| 5,732,565 | A * | 3/1998 | Ramakrishnan et al. | 62/298 |
| 6,095,281 | A * | 8/2000 | Jianxing | 181/200 |
| 6,196,015 | B1 * | 3/2001 | Pignolo | 62/285 |
| 6,202,969 | B1 * | 3/2001 | Orr | 248/301 |
| 6,298,678 | B1 * | 10/2001 | Kim | 62/262 |
| 6,412,298 | B2 * | 7/2002 | Kang et al. | 62/262 |
| 6,431,257 | B1 * | 8/2002 | Sano et al. | 165/42 |
| 2001/0035021 | A1 * | 11/2001 | Kang et al. | 62/262 |
| 2002/0104972 | A1 * | 8/2002 | Guzorek | 250/504 R |

\* cited by examiner

*Primary Examiner* — Mohammad M Ali

(57) ABSTRACT

Provided, in aspect, is a suspension bracket for use with an HVAC component. The suspension bracket, in one embodiment, may include a base portion, a first tab portion coupled to the base portion, wherein the first tab portion is positioned substantially perpendicular to the base portion, and a second tab portion coupled to the base portion. The second tab portion, in this embodiment, may include a first region and a second region, wherein the first region is positioned substantially perpendicular to the base portion, and further wherein the second region is positioned substantially perpendicular to the base portion and the first region.

18 Claims, 5 Drawing Sheets

SUSPENSION BRACKET

CROSS-REFERENCE TO RELATED APPLICATION

This application claims the benefit of U.S. Provisional Application Ser. No. 61/295,501, filed by Shailesh S. Manohar, et al., on Jan. 15, 2010, entitled "An Improved Heating Furnace for a HVAC System", and incorporated herein by reference in its entirety.

TECHNICAL FIELD

This application is directed, in general, to brackets, and, more specifically, to suspension brackets for use with furnace and/or HVAC system components.

BACKGROUND

In horizontal installations of furnace and/or HVAC system components, particularly those in an attics or crawl spaces, installers typically suspend the furnace and/or HVAC system components by fastening field supplied plumber straps to the sides or tops thereof. In particular, the installers of the furnace and/or HVAC system components typically screw the plumbers strap directly into the sidewalls or tops of the cabinet housing the same.

While such an installation technique is generally capable of suspending the cabinets for an extended period of time, such an installation technique experiences many drawbacks. First, this type of installation technique involves guessing the required number and location of suspension points. Accordingly, the cabinet may not be positioned plumb (level) after installation. Additionally, the randomly and haphazardly located screws often make it difficult to remove and install access panels of the cabinet, as well as often puncture critical features located within the cabinet, resulting in nuisance shutdowns.

Accordingly, what is needed in the art is a suspension bracket for suspending furnace and/or HVAC system components that does not experience the problems of prior art designs.

SUMMARY

One aspect provides a suspension bracket for use with an HVAC component. In one embodiment, the suspension bracket includes a base portion, a first tab portion coupled to the base portion, wherein the first tab portion is positioned substantially perpendicular to the base portion, and a second tab portion coupled to the base portion. The second tab portion, in this embodiment, includes a first region and a second region, wherein the first region is positioned substantially perpendicular to the base portion, and further wherein the second region is positioned substantially perpendicular to the base portion and the first region.

A method for manufacturing a suspension bracket is provided in another aspect. The method, in this embodiment, includes providing a base portion, positioning a first tab portion substantially perpendicular to the base portion, wherein the a first tab portion is coupled to the base portion, and locating a first region of a second tab portion perpendicular to the base portion and a second region of the second tab portion perpendicular to the first base portion and the first region, wherein the second tab portion is coupled to the base portion.

Yet another aspect provides an HVAC system. The HVAC system, in one embodiment, includes an HVAC component and two or more suspension brackets coupleable to an exterior surface of the HVAC component. In this embodiment, each of the suspension brackets, includes 1) a base portion having a mounting hole therein, 2) a first tab portion coupled to the base portion, wherein the first tab portion is positioned substantially perpendicular to the base portion, and 3) a second tab portion coupled to the base portion and having a first region and a second region, wherein the first region is positioned substantially perpendicular to the base portion, and further wherein the second region is positioned substantially perpendicular to the base portion and the first region.

BRIEF DESCRIPTION OF DRAWINGS

Reference is now made to the following descriptions taken in conjunction with the accompanying drawings, in which.

DETAILED DESCRIPTION

Figure 1A:
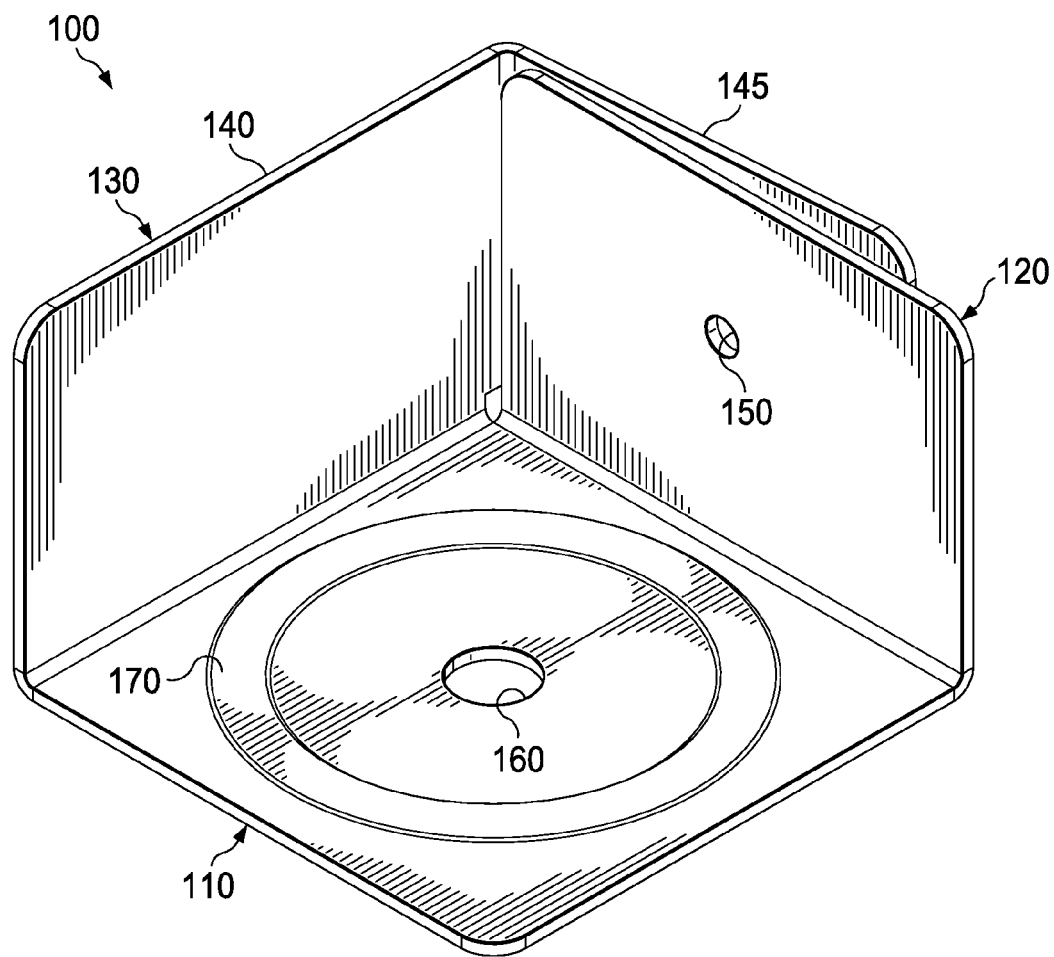
FIGS. 1A thru 1E illustrate various different views of a suspension bracket in accordance with the disclosure.
Figure 1B:
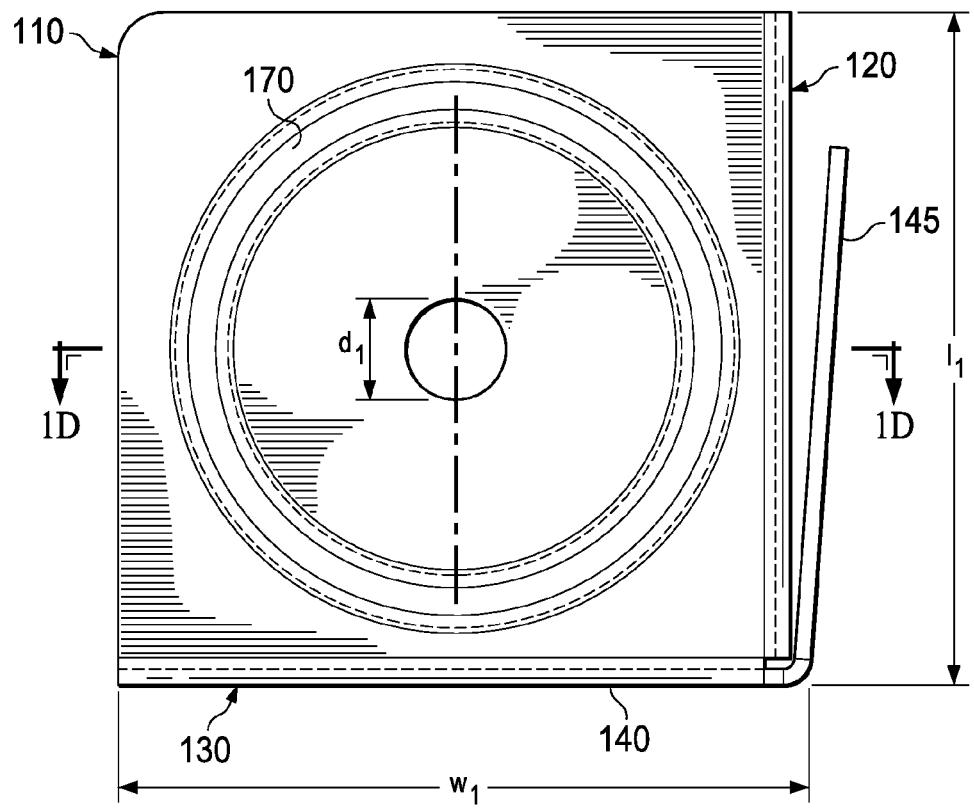
Figure 1C:
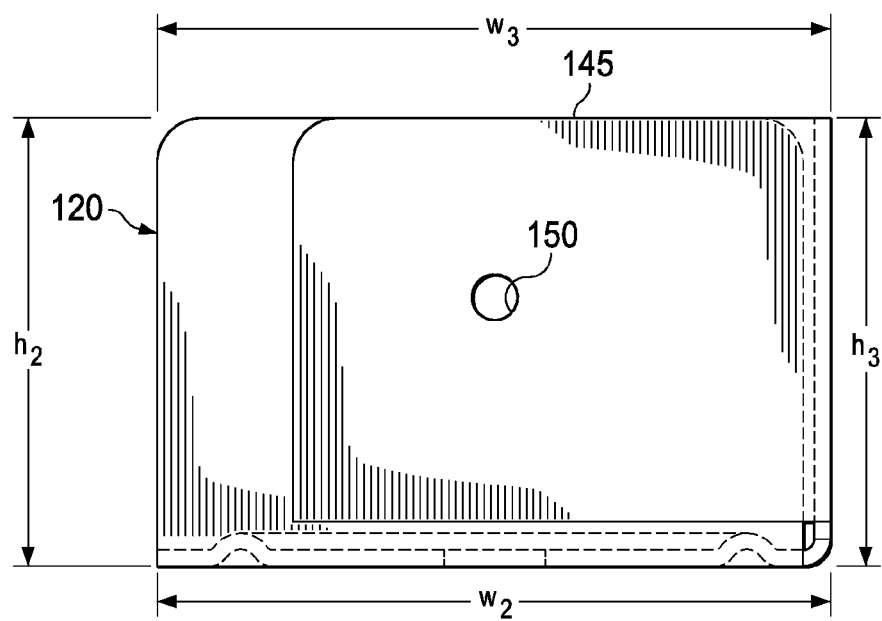
Figure 1D:
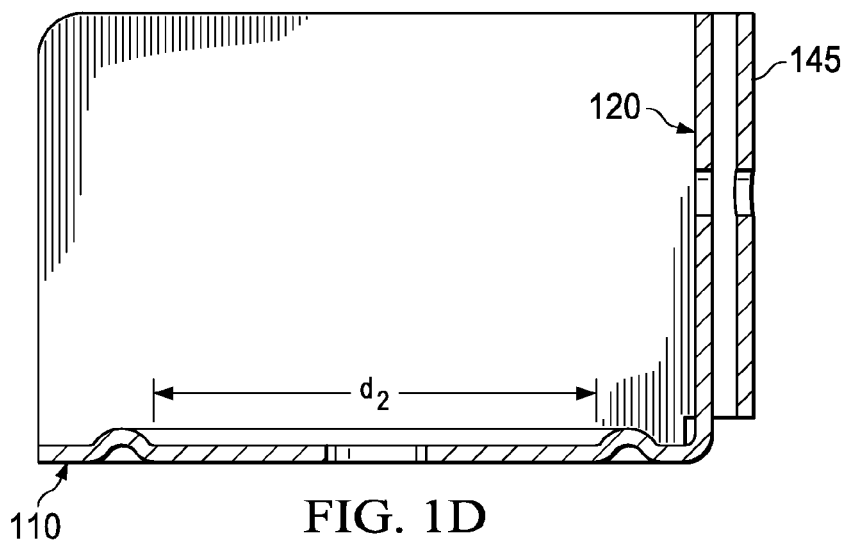
Figure 1E:
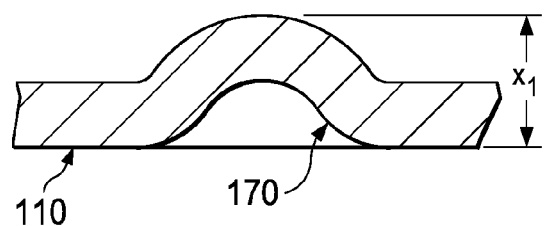

Referring initially to FIGS. 1A thru 1E, illustrated are various different views of an embodiment of a suspension bracket 100 provided in accordance with this disclosure. Specifically, FIG. 1A illustrates a perspective view of the suspension bracket 100, whereas FIG. 1B illustrates a top surface view, FIG. 1C illustrates a right side view, FIG. 1D illustrates a cross-sectional view of the suspension bracket 100 taken through the line D-D of FIG. 1B, and FIG. 15 illustrates an exploded view of a portion of FIG. 1D.

A suspension bracket in accordance with this disclosure, such as the suspension bracket 100 of FIGS. 1A thru 1E, is generally configured to be used with a Heating, Ventilating and Air Conditioning (HVAC) component. The term HVAC component, as used herein, is intended to include any component of an HVAC system, including without limitation, a heating component (e.g., boiler, furnace, heat pump, etc.), a ventilation component (e.g., a fan, ductwork, etc.), an air conditioning component (e.g., evaporator coils, condenser coils, etc.) and any other related component. Accordingly, an HVAC component is not limited to any specific component.

The suspension bracket 100 of FIGS. 1A thru 1E initially includes a base portion 110. The base portion 110, in this embodiment, is rectangular (e.g., square) in shape. Nevertheless, the base portion 110 could take on many different shapes, including the shape of an ellipse, parallelogram, etc. and remain within the purview of the disclosure. Likewise, the base portion 110 may vary in size. For example, as shown in FIG. 1B, the base portion 110 may have a width ($w_1$) and length ($l_1$). In one embodiment, each of the width ($w_1$) and length ($l_1$) of the base portion 110 ranges from about 1 inch to about 4 inches. In another embodiment, each of the width ($w_1$) and length ($l_1$) of the base portion 110 ranges from about 1.5 inches to about 2.5 inches, among others.

The suspension bracket 100 of FIGS. 1A thru 1E further includes a first tab portion 120. The first tab portion 120, in the embodiment shown, is coupled to the base portion 110. Additionally, in the embodiment shown, the first tab portion 120 is positioned substantially perpendicular to the base portion 110. For example, in the embodiment of FIGS. 1A thru 1E, the first tab portion 120 is bent upward (e.g., in relative terms) from the base portion 110, thereby making them substantially perpendicular to one another.

The first tab portion 120, in this embodiment, is rectangular in shape. Nevertheless, the first tab portion 120 could take on many different shapes, including the shape of an ellipse, parallelogram, etc. and remain within the purview of the disclosure. Likewise, the first tab portion 120 may vary in size. For example, as shown in FIGS. 1B and 1C, the first tab portion 120 may have a width ($l_1$) and height ($h_2$). In one embodiment, the width ($l_1$) of the first tab portion 120 ranges from about 1 inch to about 4 inches and the height ($h_2$) of the first tab portion 120 ranges from about 0.5 inches to about 1.5 inches. In another embodiment, the width ($l_1$) of the first tab portion 120 ranges from about 1.5 inches to about 2.5 inches and the height ($h_2$) of the first tab portion 120 ranges from about 1.1 inches to about 1.3 inches.

The suspension bracket 100 of FIGS. 1A thru 1E further includes a second tab portion 130. The second tab portion 130, in the embodiment shown, is coupled to the base portion 110. Additionally, the second tab portion 130, in the embodiment shown, includes a first region 140 and a second region 145. Additionally, in the embodiment shown, the first region 140 is positioned substantially perpendicular to the base portion 110. Likewise, in the embodiment shown, the second region 145 is positioned substantially perpendicular to the base portion 110 as well as substantially perpendicular to the first region 140. Additionally, in the embodiment shown, the second region 145 is positioned substantially parallel to the first tab portion 120. For example, in the embodiment of FIGS. 1A thru 1E, the second tab portion 130 is bent upward (e.g., in relative terms) from the base portion 110 to form the first region 140. Additionally, in this embodiment, the second region 145 is bent forward (e.g., in relative terms) to cause the second region 145 to be substantially parallel to the first tab portion 120.

The first and second regions 140, 145, of the second tab portion 130, in this embodiment, are rectangular in shape. Nevertheless, the first and second regions 140, 145 can take on many different shapes and remain within the purview of the disclosure. Likewise, the first and second regions 140, 145 may vary in size. For example, as shown in FIGS. 1B and 1C, the first region 140 may have a width ($w_1$) and height ($h_2$). As indicated earlier, the width ($w_1$) may range from about 1 inch to about 4 inches, and from about 1.5 inches to about 2.5 inches in another embodiment. Likewise, as indicated earlier, the height ($h_2$) of the first region 140 may range from about 0.5 inches to about 1.5 inches, and in another embodiment from about 1.1 inches to about 1.3 inches. Likewise, as shown in FIGS. 1B and 1C, the second region 145 may have a width ($w_3$) and height ($h_3$). The width ($w_3$), in one embodiment, may range from about 1 inch to about 3 inches, and from about 1.25 inches to about 2 inches in another embodiment. The height ($h_3$) of the second region 145 may range from about 0.4 inches to about 1.4 inches, and in another embodiment from about 0.75 inches to about 1.2 inches, among others.

The suspension bracket 100 of FIGS. 1A thru 1E further includes holes 150 located within the first tab portion 120 and the second region 145 that are substantially aligned with one another (substantially aligned holes). The substantially aligned holes 150, in one embodiment, are self tapping holes. The phrase "self tapping holes", as used herein, refers to the fact that the substantially aligned holes 150 are of an appropriate size to accommodate a self tapping screw without the use of a termination (e.g., a nut in one example). As an example, in one embodiment plumber's strap (e.g., metal strap having a plurality of holes therein, metal strap not having a plurality of holes therein, nylon strap without or without a plurality of holes therein, etc.) is positioned between the first tab portion 120 and the second region 145. Thereafter a self tapping screw can easily engage the self tapping holes 150 to couple the suspension bracket 100 to the plumber's strap.

The suspension bracket 100 of FIGS. 1A thru 1E further includes a mounting hole 160 located in the base portion 110. The mounting hole 160, in the embodiment shown, is located at approximately a center point of the base portion 110. The mounting hole 160, in one embodiment, is circular. For example, the mounting hole 160 might have a diameter ($d_1$) ranging from about 0.2 inches to about 0.5 inches, among others.

The suspension bracket 100 of FIGS. 1A thru 1E may further include an annular ring 170 in the base portion 110. The annular ring 170, in one example, surrounds the mounting hole 160, and is configured to engage a vibration dampening gasket. For example, an inner diameter ($d_2$) of the annular ring 170 may range from about 0.5 inches to about 2.0 inches, in one embodiment.

The annular ring 170, in one embodiment, is pressed upward from a bottom surface of the base portion 110. For example, as shown in the blown up view of FIG. 1E, the annular ring 170 may extend upward by a distance ($x_1$) ranging from about 0.05 to about 0.2 inches, among other distances. Those skilled in the art understand the process that might be used to form the annular ring 170.

Figure 2:
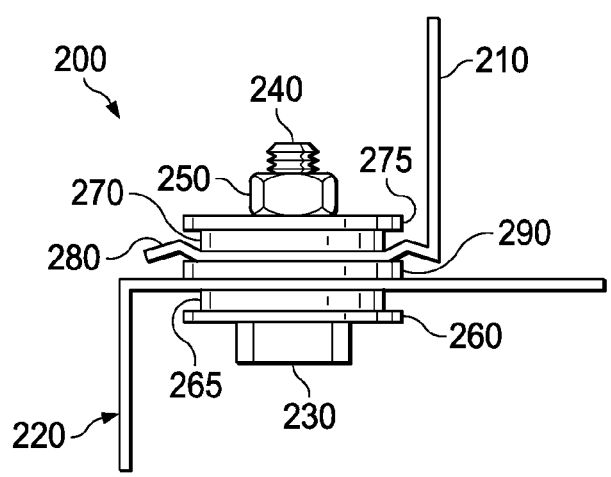
FIG. 2 illustrates an example of a fastening means coupling a suspension bracket manufactured in accordance with the disclosure to an HVAC component.

Turning briefly to FIG. 2, illustrated is an example of a fastening means 200 coupling a suspension bracket 210 manufactured in accordance with the disclosure to an HVAC component 220. The fastening means 200, in this embodiment, includes a head 230, a threaded shaft 240 and a termination 250 (e.g., a nut in one example). The fastening means 200 of FIG. 2 additionally includes a first washer 260 positioned over the threaded shaft 240 and against the head 230, as well as a first vibration dampening gasket 265 positioned over the threaded shaft 240 and against the first washer 260. Thereafter, the fastening means 200 having the first washer 260 and first vibration dampening gasket 265 may be placed within corresponding holes in the suspension bracket 210 and HVAC component 220. Subsequently, a second vibration dampening gasket 270 and a second washer 275 may be placed over threaded shaft 240, followed by the termination 250, thereby coupling the two.

In the embodiment shown, for example wherein the fastening means 200 is installed from the inside of the HVAC component 220, the second vibration dampening gasket 270 is engaged by an annular ring 280 in the suspension bracket 210. Were the fastening means 200 to be installed from the outside of the HVAC component 220, the first vibration dampening gasket 265 would be engaged by the annular ring 280. In another example embodiment, another vibration dampening gasket 290 separates the suspension bracket 210 and the HVAC component 220. The collection of the vibration gaskets, and annular ring, among other members, assists in the reduction of vibration in the HVAC system during use thereof. For example, in one embodiment the vibration dampening gaskets 265, 270, 290 comprise a material suitable to reduce vibration, such as rubber and/or plastic. Nevertheless, the vibration dampening gaskets 265, 270, 290 may comprise other materials and remain within the purview of the disclosure.

Figure 3:
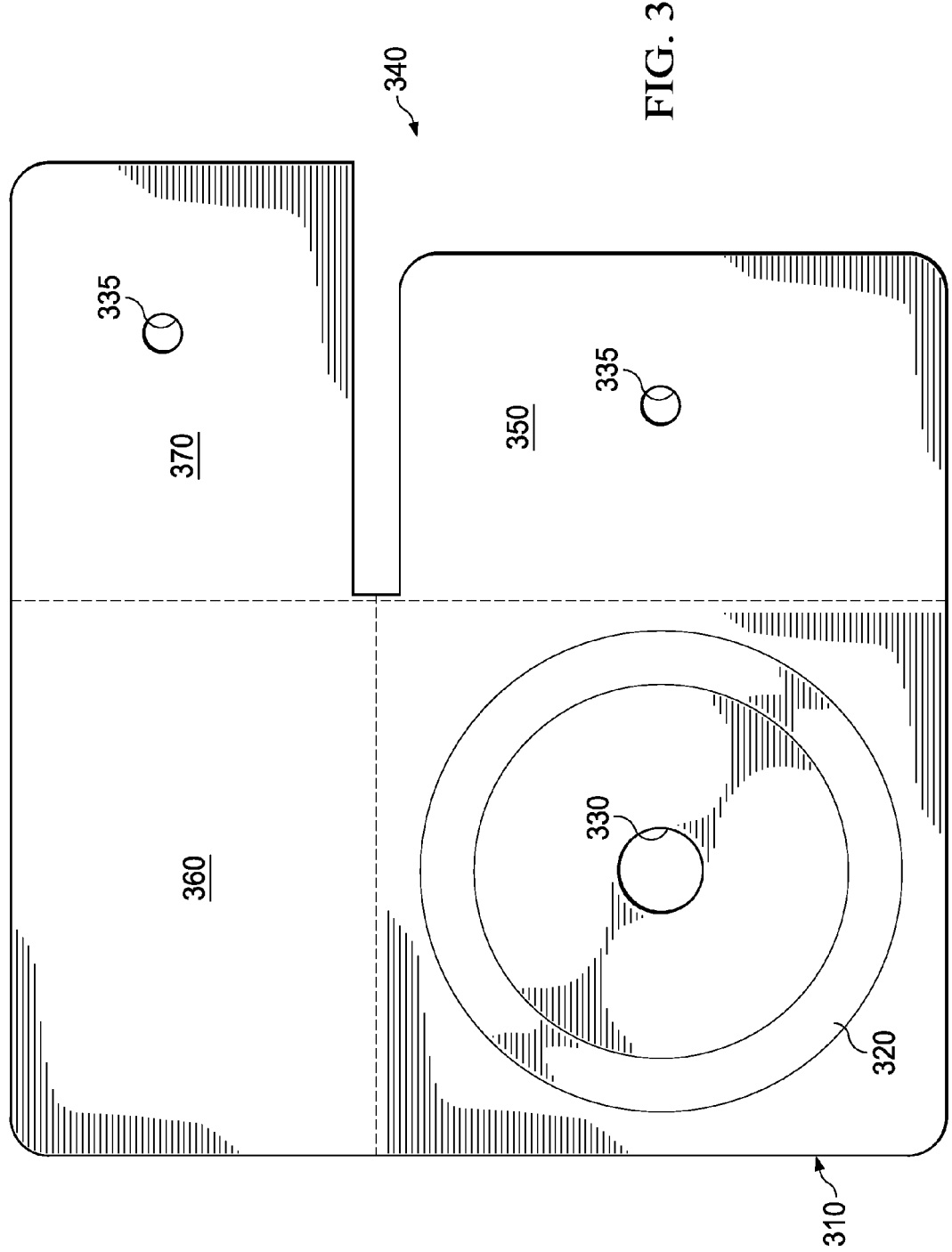
FIG. 3 illustrates one embodiment for forming a suspension bracket in accordance with the disclosure.

Turning briefly to FIG. 3, illustrated is one example embodiment of a method for forming a suspension bracket in accordance with the disclosure. In this embodiment, a single piece of material 310 (e.g., metal, plastic, etc.) is first provided. Thereafter, an annular ring 320, mounting hole 330, and self tapping holes 335 may be formed in the material 310, for example stamped within the material 310. Likewise, a separation 340 may be formed in the material 310. Thereafter, a first area 350 of the material 310 may be bent upward to form a feature similar to the base portion 110 and first tab portion 120 of FIG. 1. Thereafter, the second area 360 of the material 310 may be bent upward, thereby forming a feature similar to the first region 140 of the second tab portion 130 of FIG. 1. Thereafter, a third area 370 of the material 310 may be bent forward, thereby forming a feature similar to the second region 145 of the second tab portion 130 of FIG. 1. As those skilled in the art appreciate, many other processes could be used to manufacture a suspension bracket in accordance with the present disclosure.

Figure 4:
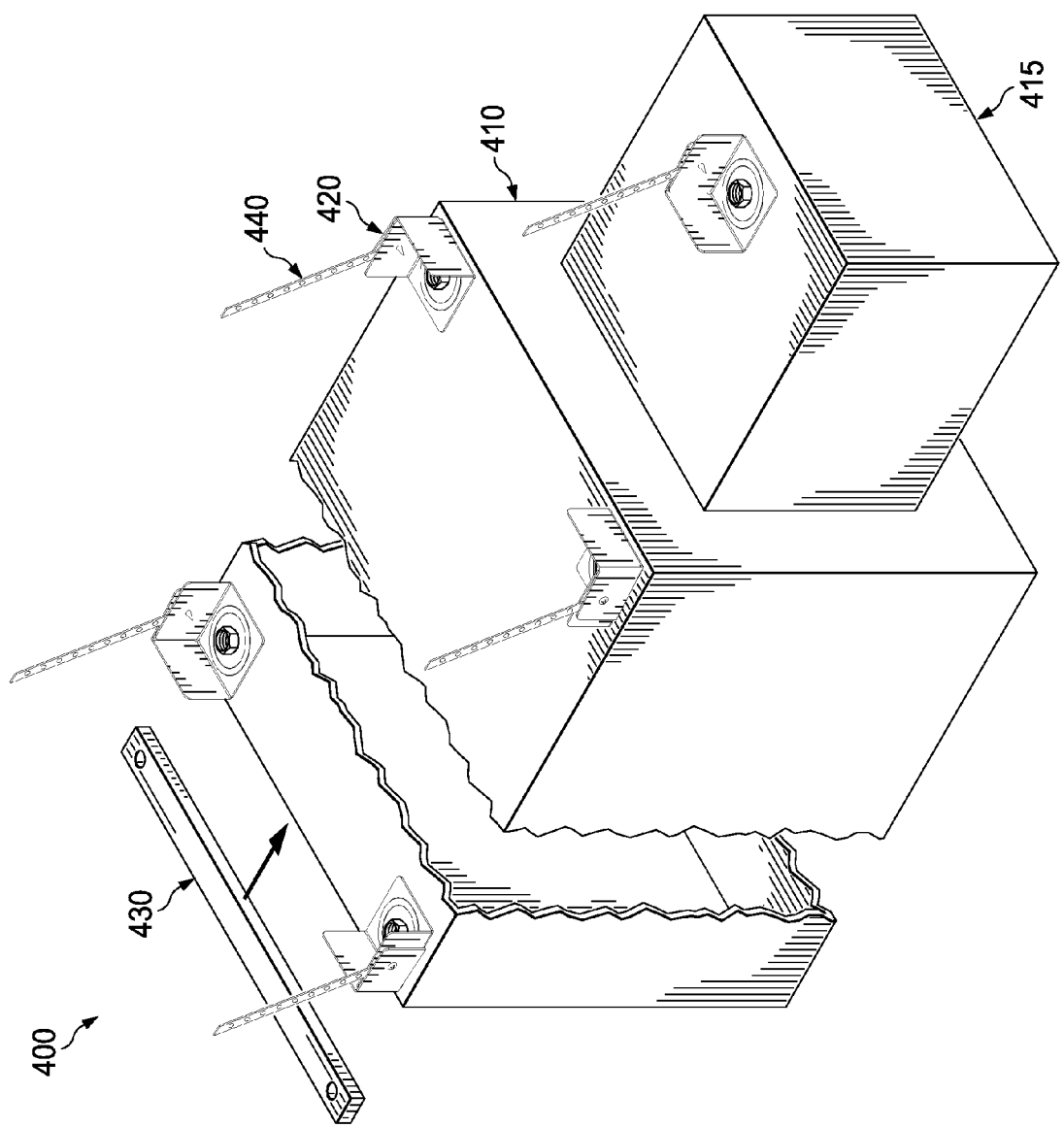
FIG. 4 illustrates a HVAC system in accordance with the disclosure.

Turning to FIG. 4, illustrated is an HVAC system 400 in accordance with the disclosure, The HVAC system 400, in one embodiment, includes an HVAC component 410, such as defined above, including ductwork 415. Coupled to an exterior surface of the HVAC component 410, in one embodiment, are two or more suspension brackets 420. The two or more suspension brackets 420, in one embodiment, are each similar to the suspension bracket 100 illustrated and described with respect to FIGS. 1A thru 1E. Nevertheless, other configurations within the scope of this disclosure could also be used.

In one particular embodiment, the HVAC component 410 has predetermined locations for its two or more suspension brackets 420. For example, the HVAC component 410 might have predrilled holes located at various different locations therein. Accordingly, inserts may be installed in those predrilled holes that are not being employed by the two or more suspension brackets 420, and/or removed from the predrilled holes that are being employed by the two or more suspension brackets 420. Such a configuration allows the two or more suspension brackets 420 to be installed in locations known to provide the utmost support, as well as locations known to be devoid of critical components that might be damaged during the suspension bracket 420 installation process. Likewise, this configuration would generally reduce the installation time associated with the two or more suspension brackets 420. Other recognizable benefits would also exist as a result of the aforementioned configuration.

The HVAC system 400, in one embodiment, further includes a stabilizing cross member 430. The stabilizing cross member 430, in the embodiment shown, couples collections (e.g., pairs) of the suspension brackets 420. Such a stabilizing cross member 430 is particularly useful in those situations wherein the structural integrity of the HVAC component alone, is insufficient to support the HVAC system in an elevated position.

The HVAC system 400, in the illustrated embodiment, further includes elevating members 440 coupled to each of the two or more suspension brackets 420. The elevating members 440, in one embodiment, each comprise plumber's strap. Nevertheless, other elevating members, such as string, wire, etc. could also be used.

Those skilled in the art to which this application relates will appreciate that other and further additions, deletions, substitutions and modifications may be made to the described embodiments.

What is claimed is:

1. A suspension bracket for use with an HVAC component, comprising:
   a base portion;
   a first tab portion coupled to the base portion, wherein the first tab portion is positioned substantially perpendicular to the base portion; and
   a second tab portion coupled to the base portion and having a first region and a second region, wherein the first region is positioned substantially perpendicular to the base portion, and further wherein the second region is positioned substantially perpendicular to the base portion and the first region, and further wherein the base portion, first tab portion and second tab portion comprise a single piece of material.

2. The suspension bracket as recited in claim 1 wherein the first tab portion and the second region are substantially parallel to each other.

3. The suspension bracket as recited in claim 2 further including substantially aligned holes located within the first tab portion and the second region.

4. The suspension bracket as recited in claim 3 wherein the substantially aligned holes are self tapping holes.

5. The suspension bracket as recited in claim 1, further including a mounting hole located in the base portion.

6. The suspension bracket as recited in claim 5, further including an annular ring pressed upward from a bottom surface of the base portion.

7. The suspension bracket as recited in claim 6 wherein the annular ring surrounds the mounting hole.

8. The suspension bracket as recited in claim 7 wherein the annular ring is configured to engage a vibration dampening gasket.

9. The suspension bracket as recited in claim 1 wherein the single piece of material is a single piece of stamped metal.

10. A method of fabricating a suspension bracket for use with an HVAC component, comprising:
    providing a base portion;
    positioning a first tab portion substantially perpendicular to the base portion, wherein the a first tab portion is coupled to the base portion; and
    locating a first region of a second tab portion perpendicular to the base portion and a second region of the second tab portion perpendicular to the base portion and the first region, wherein the second tab portion is coupled to the base portion, and further wherein the base portion, first tab portion and second tab portion comprise a single piece of material.

11. The method as recited in claim 10 wherein locating the second region includes locating the second region substantially parallel to the first tab portion.

12. The method as recited in claim 11 further including creating substantially aligned holes within the first tab portion and the second region.

13. The method as recited in claim 12 wherein the substantially aligned holes are self tapping holes.

14. The method as recited in claim 10, further including pressing an annular ring upward from a bottom surface of the base portion, the annular ring surrounding a mounting hole placed in the base portion.

15. The method as recited in claim 14 wherein the annular ring is configured to engage a vibration dampening gasket.

16. An HVAC system, comprising:
    an HVAC component; and
    two or more suspension brackets coupleable to an exterior surface of the HVAC component, each of the suspension brackets, including:
        a base portion having a mounting hole therein;
        a first tab portion coupled to the base portion, wherein the first tab portion is positioned substantially perpendicular to the base portion; and a second tab portion coupled to the base portion and having a first region and a second region, wherein the first region is positioned substantially perpendicular to the base portion, and further wherein the second region is positioned substantially perpendicular to the base portion and the first region, and further wherein the base portion, first tab portion and second tab portion comprise a single piece of material.

17. The HVAC system as recited in claim 16, wherein each of the two or more suspensions brackets is coupled to the HVAC component using fastening means including a head, a threaded shaft and a nut, and further wherein a first washer is positioned over the threaded shaft and against the head, a first vibration dampening gasket is positioned over the threaded gasket and against the first washer, a second vibration dampening gasket is positioned over the threaded shaft, and a second washer is positioned over the threaded shaft between the second vibration dampening gasket and the nut, and further wherein a hole in the HVAC component and the mounting hole in the base portion are positioned over the threaded shaft between the first and second vibration dampening gaskets.

18. The HVAC system as recited in claim 16 wherein the two or more suspension brackets are located at opposite corners of one end of the HVAC component, and further including a stabilizing cross member coupling the two.

* * * * *